Jan. 30, 1934.                O. L. HASTINGS                1,944,979
                              VALVE MECHANISM
                            Filed April 20, 1931

Inventor
Odie L. Hastings
By Hardway Cathey
Attorneys

Patented Jan. 30, 1934

1,944,979

UNITED STATES PATENT OFFICE 1,944,979

VALVE MECHANISM

Odie L. Hastings, Houston, Tex.

Application April 20, 1931. Serial No. 531,491

4 Claims. (Cl. 251—20)

This invention relates to a valve mechanism.

One object of the invention is to provide a novel type of valve mechanism for controlling the flow of fluid in various directions and which is composed of few parts which are easily operable and are subjected to a minimum of wear.

Another object of the invention is to provide a valve mechanism wherein the valves will not be subjected to the pressure of the fluid being controlled and consequently will not be held seated against the seats, by said pressure, whereby the valves may be readily manipulated, and particularly easily unseated.

With the above and other objects in view, which will be more particularly pointed out hereinafter, the invention has particular relation to certain novel features of construction, operation, and arrangement of parts, an example of which is given in this specification and illustrated in the accompanying drawing, wherein:—

Figures 1, 2, 3:
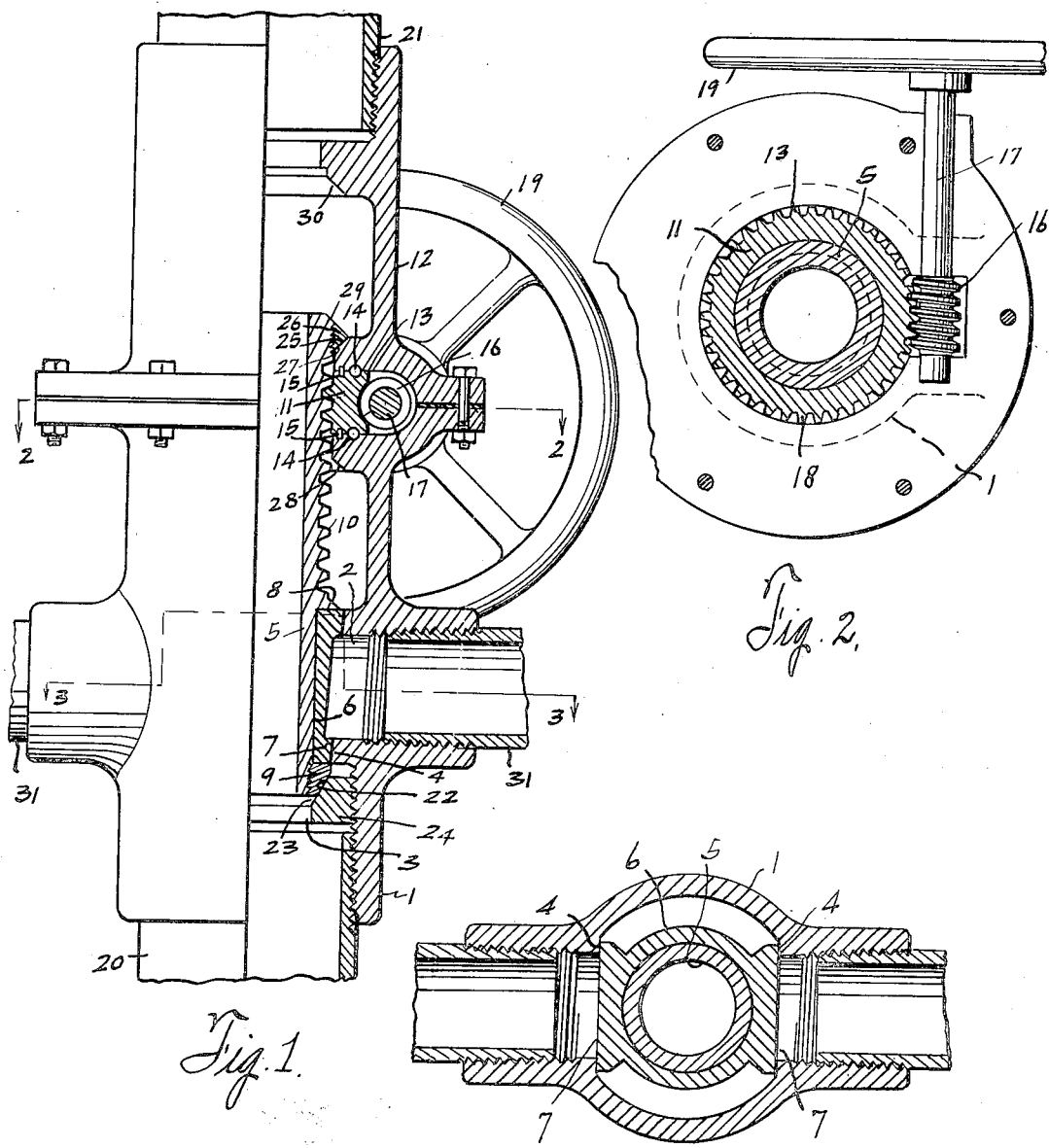
Figure 1 shows a side elevation of the valve mechanism, partly in section.
Figure 2 shows a cross sectional view taken on the line 2—2 of Figure 1.
Figure 3 shows a cross sectional view taken on the line 3—3 of Figure 1.

Referring now more particularly to the drawing, wherein like numerals of reference designate similar parts in each of the figures, the numeral 1 designates the valve casing which in the present illustration is shown as having the passageways 2 and 3 therethrough at substantially right angles. The passageway 3 is surrounded by the opposing annular seats 4, 4, said seats converging slightly. Within the passageway 3 there is a longitudinally slidable sleeve 5 on which is fitted a surrounding valve member 6 having the oppositely arranged valve faces 7, 7. These valve faces are preferably formed with annular faces which have a relative convergence corresponding to the convergence of said seats and said faces are shaped to fit closely against said seats when the valves are closed. The valve member 6 is confined between the upper, external, annular seat 8, on the sleeve 5 and the ring nut 9 which is threaded onto the lower end of the sleeve 5. The sleeve 5 is extended beyond the valves and said extended end has the external, coarse, screw threads 10 which are in mesh with similar internal threads of the ring gear 11. A tubular, flanged, connection 12 is bolted or otherwise secured, to the adjacent flanged end of the valve casing 1 and between these flanges there is an internal annular raceway 13 in which the ring gear 11 turns. This ring gear turns on suitable antifriction bearings 14, 14 and the joints between it and the raceway walls are packed by the packing rings 15, 15. There is a worm gear 16 fixed on the shaft 17 and in driving mesh with the miter gear teeth 18 on the ring gear 11. The outer end of the shaft 17 has a suitable hand wheel 19 fixed thereon.

In the combination shown the valve casing 1 is shown as being attached to the upper end of a pipe, or tubing, 20 in a well. In this combination the sleeve 5 is in alignment with the pipe 20 and the fluid flowing from the well will pass on up through the sleeve 5, when the valve faces 7 are closed, and on up through the connection 12 and through the discharge pipe 21 attached to said connection. This fluid, at times, flows under great pressure and in such case the sleeve 5 will sustain the pressure so that the valve faces 7 will not be affected thereby and will not be thereby forced against the seats 4 so as to make it difficult to unseat said valves.

The pipe 21 may carry a suitable valve, or Christmas tree equipped with valves, for controlling the outflow of the fluid. The equipment that will be carried by the pipe 21 may be of the usual and conventional construction and has consequently not been illustrated.

When the valve faces 7 are seated the tapered external surface 22, of the ring nut 9, will seat against the tapering face 23 of the ring 24 which is located within the casing 1; also the tapering face 25, of the ring 26 will seat against the beveled annular face 27 within the casing 1. Tight seals will thus be provided to prevent the escape of fluid out past the sleeve 5 and this will prevent gritty fluid from cutting out the parts.

When it is desired to open the valves the hand wheel 19 may be appropriately turned and the sleeve 5 thus moved longitudinally to lift the valve faces 7 from the seats 4 and when the valves are fully opened the seat 8 will seat against the annular, tapering seat 28, in the casing 1, and the annular beveled seat 29, at the upper end of the sleeve 5 will seat against the internal, annular, beveled seat 30 within the connection 12 and all gritty fluid and foreign matter will thus be excluded from the gears. When the valve faces 7 are opened the pipe 21 may be closed, by the valve, or valves above referred to, with which said pipe is equipped, and the fluid will then pass out through the flow lines 31, 31, connected into the casing 1 as shown.

The type of valve herein shown is adapted for use for controlling flow lines generally wherever it may be desired to use the same.

The drawing and description disclose what is now considered to be a preferred form of the invention by way of illustration only, while the broad principle of the invention will be defined by the appended claims.

What I claim is:

1. A valve casing having intersecting passageways, tubular valve means co-axial with, and longitudinally movable in, one of said passageways into one position to open the other passageway and into another position to close said other passageway, and means for moving said valve means, and sealing means about said valve means to prevent the passage of fluid about said valve means while in either of said positions.

2. A valve casing having intersecting passageways, tubular valve means co-axial with, and longitudinally movable in, one of said passageways into one position to open the other passageway and into another position to close said other passageway, said valve means and casing having coacting seats whereby fluid tight joints are formed about said valve means when in either of said positions.

3. A casing having intersecting passageways, an annular seat around one of said passageways, tubular valve means longitudinally movable in the other passageway and shaped to fit against and close said seat, when in one position, and being movable into another position to open said seat, an annular seat in said other passageway with which said valve means forms a fluid tight joint, when in said other position and means for moving said valve means.

4. A valve casing having a pair of intersecting passageways, spaced, converging, valve seats around one of said passageways, tubular valve member longitudinally movable in the other passageway and having external, tapering valve faces, said valve member being movable into one position to seat said valve faces against said seats to obstruct the corresponding passageway and being movable into another position to unseat said valve faces and open said corresponding passageway, means for moving said valve, and co-acting seats on the valve member and casing shaped to form fluid tight joints about said valve means when said valve member is in either of said positions.

ODIE L. HASTINGS.